J. S. DE LONG.
CRATE.
APPLICATION FILED MAY 22, 1912.
1,041,751.
Patented Oct. 22, 1912.
3 SHEETS—SHEET 1.
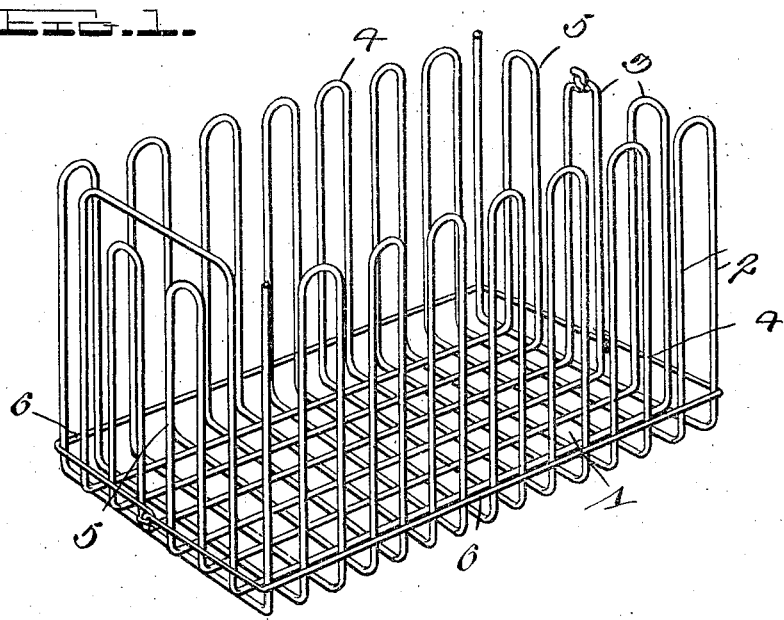
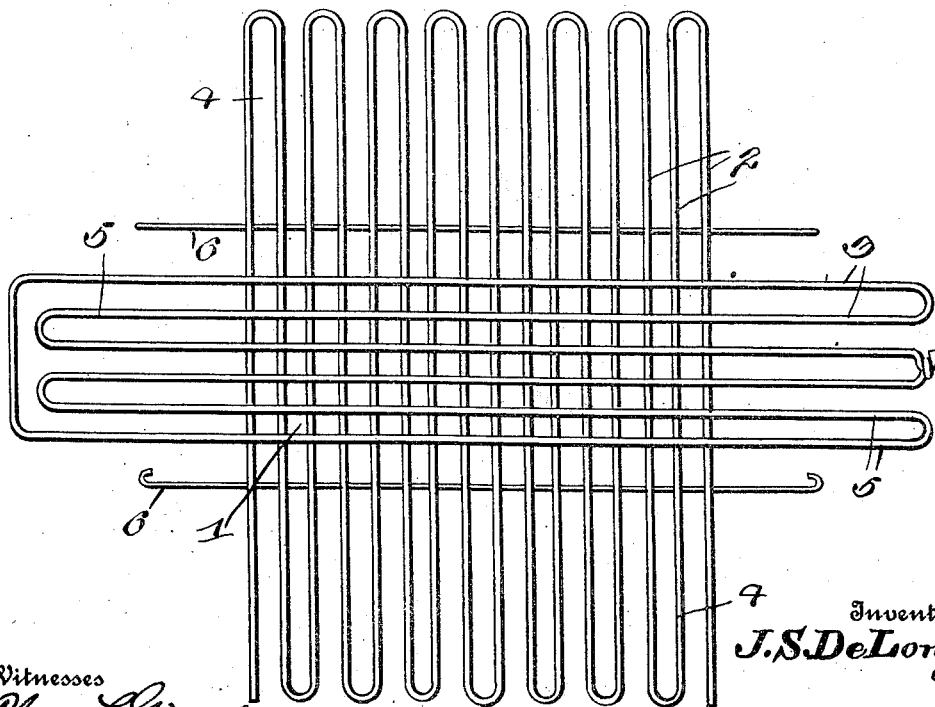
Witnesses
Chas. L. Giestner.
W. B. Norton.
Inventor
J. S. DeLong,
By Watson E. Coleman.

J. S. DE LONG.
CRATE.
APPLICATION FILED MAY 22, 1912.
1,041,751.
Patented Oct. 22, 1912.
3 SHEETS—SHEET 2.
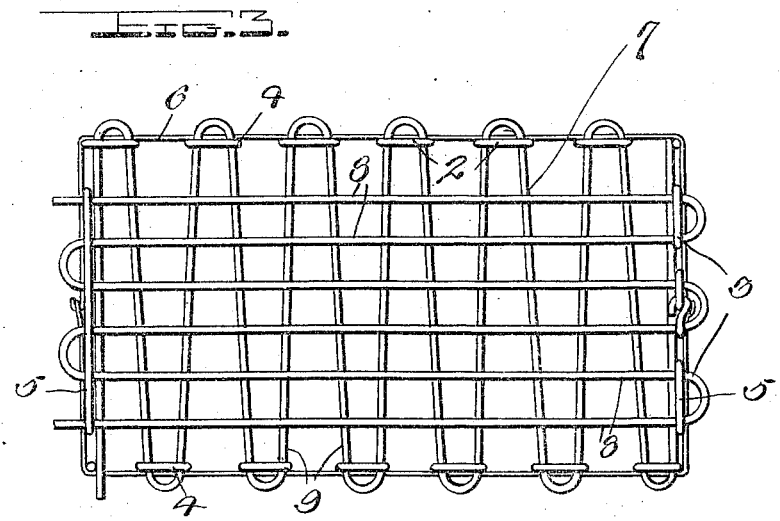
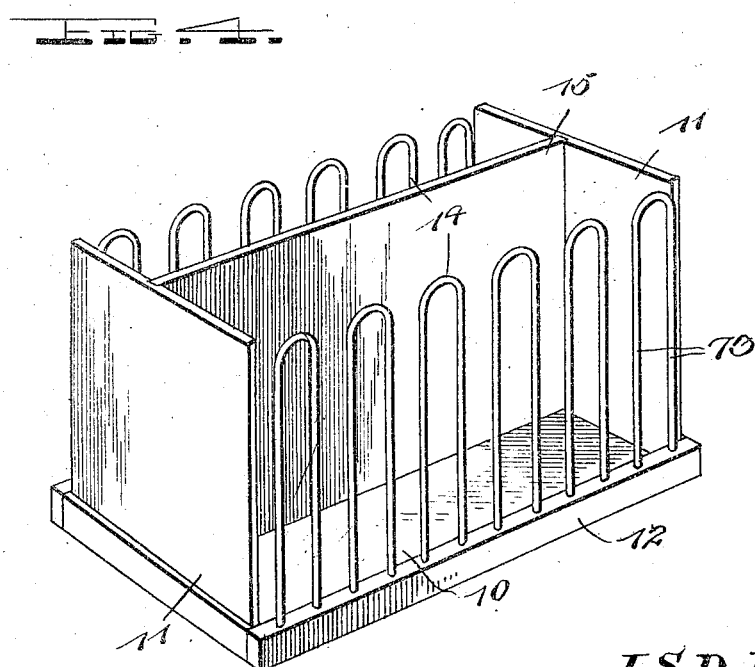
Witnesses
Chas. L. Griesbauer.
A. B. Norton.
Inventor
J. S. De Long,
By Watson E. Coleman
Attorney J. S. DE LONG.
CRATE.
APPLICATION FILED MAY 22, 1912.
1,041,751.
Patented Oct. 22, 1912.
3 SHEETS—SHEET 3.
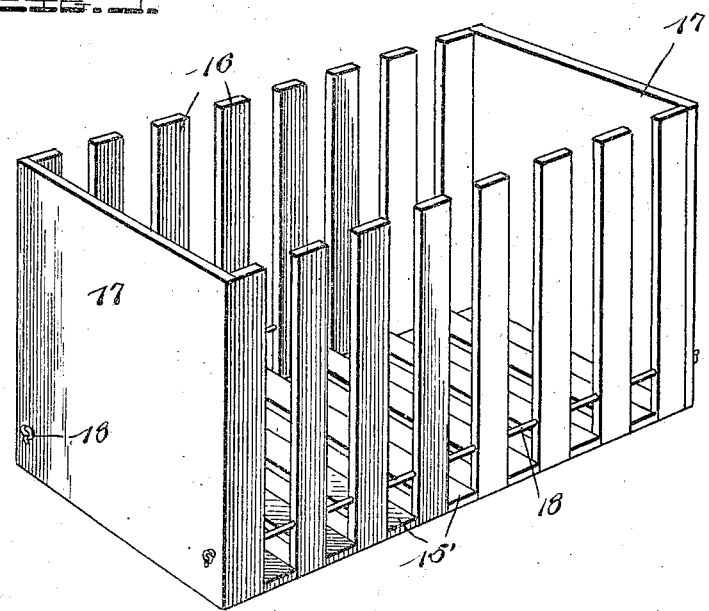
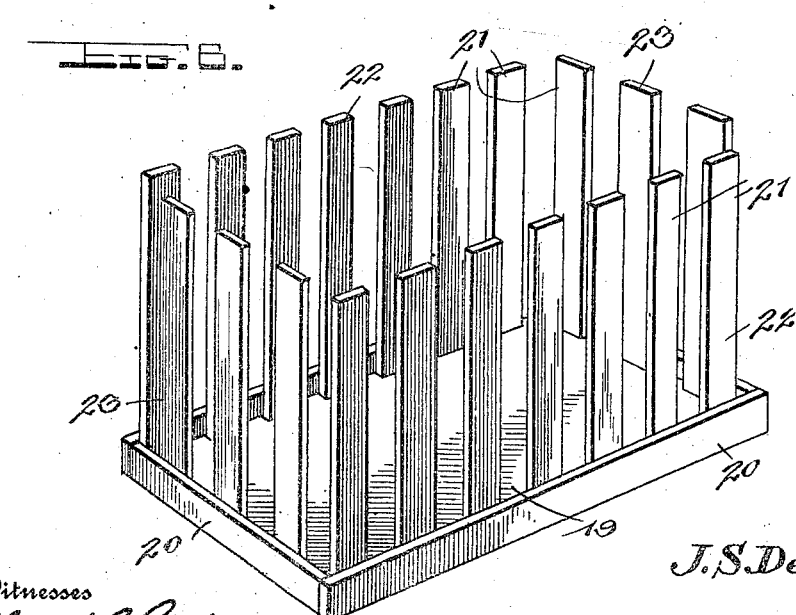
Witnesses
Geo. L. Griesbauer.
A. B. Norton.
Inventor
J. S. De Long,
By Watson E. Coleman.
Attorney

UNITED STATES PATENT OFFICE.

JOHN S. DE LONG, OF OSBORN, OHIO.

CRATE.

1,041,751.  Specification of Letters Patent.  Patented Oct. 22, 1912.

Application filed May 22, 1912. Serial No. 699,034.

*To all whom it may concern:*

Be it known that I, JOHN S. DE LONG, a citizen of the United States, residing at Osborn, in the county of Greene and State of Ohio, have invented certain new and useful Improvements in Crates, of which the following is a specification, reference being had to the accompanying drawings.

This invention relates to new and useful improvements in crates for packing and shipping vegetables and the like and has for its primary object to provide means whereby the tops or greens of the vegetables may be projected through the sides of the crate to allow the vegetables proper to be more readily packed within the device.

A further object of the invention resides in the provision of a device, the sides of which are formed of spaced members between which the tops of the vegetables may extend and still another object of the invention resides in the provision of a removable top for the device formed of transversely and longitudinally extending looped wires.
Another object of the invention resides in the provision of looped wires forming the sides of the preferred form of the invention which are adapted to receive in engagement therewith portions of the top member and the spaces between which are adapted to receive the projecting tops of the vegetables.

With these and other objects in view, the invention consists in the novel features of construction, combination and arrangement of parts as will be hereinafter referred to and more particularly pointed out in the specification and claims.

In the accompanying drawings forming a part of this application, Figure 1 is a perspective view of the preferred form of my invention. Fig. 2 is a plan view of the wires forming the same previous to the bending thereof to form the sides and ends of the device. Fig. 3 is a top plan view of the device shown in Fig. 1 with the top applied thereto. Fig. 4 is a perspective view of a slightly modified form of the invention. Fig. 5 is a similar view of a further modified form; and Fig. 6 is a perspective view of a still further modified form of the invention.

In describing my invention, I shall refer to the drawings in which similar reference characters designate corresponding parts throughout the several views and in which 1 indicates a bottom of my improved crate formed of the transverse and longitudinally extending wires 2 and 3 respectively, the wires 2 being portions of a single strand of wire which is continued and looped or convoluted at regular intervals to form sides 4 for the device. The longitudinally extending wires 3 which form a portion of the bottom 1 are also portions of a single strand of wire which is continued and looped or convoluted at projecting points to form the ends 5 for the device. The transversely extending portions 2 of the one single strand of wire may be secured, if desired, in any preferred manner to the longitudinally extending portions 3 of the other single strand of wire and previous to the forming of the device proper, the wires will appear as shown in Fig. 2, but in order to retain the sides and ends 4 and 5 respectively in upright position as shown in Fig. 1, I provide the pair of bracing wires 6, which extend around the lower portions of the sides and ends of the device and interlock with one another at said ends.

From the construction shown and described, it will be seen that spaces will be defined by the looped portions of the wire forming the sides and ends of the device and open-ended spaces also provided between these looped portions of the wires, and I have provided a top 7 for the device which is designed to coöperate with this particular formation of the sides and ends thereof. To this end, the top is formed of a pair of wires 8 and 9, the former being looped or convoluted to form longitudinally extending wires, while the latter is similarly designed to form transversely extending wires, said transversely and longitudinally extending wires being engaged with one another in any desired manner. This formation provides a plurality of loops on the sides and ends of the top, which loops are spaced apart and adapted to be entered within the loops of the sides and ends 4 and 5 of the device proper. In order to enter the loops of the top within the loops of the body of the device, the former will necessarily be sprung into position which will, it will be seen, securely retain said top in various adjusted positions in the body of the device, it being understood that said top is capable of vertical movement within the body when once positioned therein.

A device formed in accordance with this construction, will permit of vegetables and the like being readily packed within the body of the device to allow the tops thereof to project through the spaces between the loops forming the sides and ends of said device. The inclosure defined by the sides and ends may, therefore, be utilized entirely for the vegetables proper so that a greater number of the same may be packed therewithin and it will further be seen that when it is desired to remove the vegetables therefrom, the same may be accomplished in a systematic manner by grasping the tops, which project beyond the sides and ends of the device and draw upwardly thereon.

In Fig. 4 of the drawings, I have shown a slightly modified form of the invention wherein the device is provided with a wood bottom 10 and the wood ends 11. The side edges of the bottom are provided with the upwardly extending flanges 12, the upper faces of which have engaged therewith the ends of the wires 13 which are bent or looped in a U-shaped manner to form the sides 14 for the device. I have also provided a central division wall 15 which is removably mounted between the ends 11 and the bottom 10 of the device and which may be entirely omitted, if desired. As the side walls of this device are substantially the same in design as the side walls of the other form shown in Fig. 1, the top 7 for the latter may also be used in connection with this modified form shown in Fig. 4.

In Fig. 5, I have shown a still further modified form of the invention, wherein a bottom 15' is formed of a plurality of transversely extending slats which may be held together in any desired manner and held between said slats at the ends thereof, are the vertically extending slats 16 which form the side walls of the device. Solid end walls 17 are also secured between the end slats of the device and are secured to the end slats of the side walls by means of the longitudinally extending wires 18 which extend through the slats 16 adjacent the lower ends thereof, said wires being also extended through said end walls. From this construction it will be seen that the side walls are formed of spaced vertically extending slats 16 and the top 7 shown in connection with the first form of the invention may also be used in connection with this form. In applying the top to this form shown in Fig. 5, the slats projecting on the side edges of the device are slightly spread and sprung over the upper ends of the slats 16 forming the side walls of the device and it will be appreciated that said top will then be capable of a vertical movement and will be securely held in any adjusted position. If desired, the central division wall may also be used in connection with this form of the device.

In Fig. 6, I have shown a still further modified form of the invention which is extremely similar to the form shown in Fig. 5. In this form, a bottom 19 has the side and end edges thereof provided with upwardly extending flanges 20, the inner faces of which have nailed or otherwise secured thereto, a plurality of vertically extending slats 21. These slats are spaced at regular intervals throughout the length and width of the bottom, so as to provide side and ends walls 22 and 23 respectively therefor and it will be appreciated that while this form is considerably different in direct structure from that shown in the first form of the invention, the principle is the same, which permits the vegetables to be packed within the device. In this form, it will also be appreciated that the top 7 used in connection with the first form may also be applied, the loops thereof being adapted to be sprung over the respective upper edges of the respective slats.

From the foregoing description of the construction of my device, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. A crate of the class described comprising a bottom, side and end walls therefor, the side walls being composed of spaced vertical members, and a top for the device having projecting loops on the side edges thereof, said loops being adapted for adjustable engagement with the spaced members of the side walls.

2. A crate of the class described comprising a bottom, side and end walls therefor, said side walls being composed of spaced vertical members, and a top formed of longitudinally and transversely extending loops, the transverse loops being adjustably engaged with said vertical members to permit vertical movement of said top thereon.

3. A crate of the class described comprising a bottom, side and end walls therefor, the side walls being composed of spaced vertical members, and a top composed of wires looped to form longitudinally and transversely extending wires, the loops of the transversely extending wires being projected beyond the side edges thereof to interlock with the spaced members of the side walls, whereby said top will be securely retained within the device and capable of a vertical movement therein.

4. A crate of the class described comprising a bottom, side and end walls therefor, the side walls being provided with spaced vertical members, and a top composed of transverse and longitudinally extending wires, said longitudinal and transversely extending wires being formed respectively from single strands of wires looped a number of times, the loops of wire forming the transversely extending wires being adapted to coöperate with the spaced members of the side walls to adjustably retain said top therebetween.

5. A crate of the class described comprising a bottom, side and end walls therefor, said side and end walls being respectively formed of single strands of wire looped a number of times and said bottom being formed of the transversely extending sections of the two strands of wire forming said side and end walls, bracing wires encircling said side and end walls, and a top composed of wires looped a number of times, the loops of said top being adapted to coöperate with the loops of the side and end walls to adjustably retain said top therebetween.

6. A crate of the class described comprising a bottom, side and end walls therefor, said side and end walls being respectively formed of single strands of wire looped a number of times, said bottom being formed of the transversely extending sections of the strands forming said side and end walls, bracing wires encircling said side and end walls, and a top composed of wires adjustably engaged with the loops of said side and end walls to permit vertical movement of the top thereon.

In testimony whereof I hereunto affix my signature in the presence of two witnesses.

JOHN S. DE LONG.

Witnesses:
WELLMORE B. TURNER,
ROLLA M. GALLOWAY.